Nov. 20, 1956  J. S. DA COSTA  2,771,175
OVERHEAD CONVEYOR
Filed May 25, 1951  6 Sheets-Sheet 1

Fig.1

Inventor
James Starr Da Costa
by Parker & Carter
Attorneys

Nov. 20, 1956

J. S. DA COSTA 2,771,175

OVERHEAD CONVEYOR

Filed May 25, 1951

Inventor
James Starr Da Costa
by Parker Carter
Attorneys

Nov. 20, 1956 J. S. DA COSTA 2,771,175
OVERHEAD CONVEYOR
Filed May 25, 1951 6 Sheets-Sheet 3

Inventor
James Starr Da Costa
by Parker & Carter
Attorneys

United States Patent Office 2,771,175
Patented Nov. 20, 1956

2,771,175

OVERHEAD CONVEYOR

James Starr Da Costa, Merchantville, N. J., assignor to Samuel Olson Mfg. Company, Inc., Chicago, Ill., a corporation of Illinois Application May 25, 1951, Serial No. 228,316

14 Claims. (Cl. 198—25)

This invention relates to a conveying system and mechanism and has for one object to provide a system by means of which articles to be conveyed, such as baggage, may be sent to and received from a plurality of conveyors, at the same time.

Another object is to provide a conveying system in which transfer means are provided between conveyors.

Another object is to provide a conveying system in which means are provided for continuously and automatically transferring articles from a main or trunk conveyor to any one of a plurality of final conveyors.

Another object is to provide a conveying system in which there is at least one main or trunkline conveyor, and a plurality of outboard or final conveyors and transfer means whereby articles may be selectively and automatically transferred from the trunk conveyor to a designated outboard or final conveyor.

Other objects will appear from time to time throughout the specification and claims.

This invention is illustrated more or less diagrammatically in the accompanying drawings, wherein.

Like parts are indicated by like characters throughout the specification and the drawings.

Figure 1:
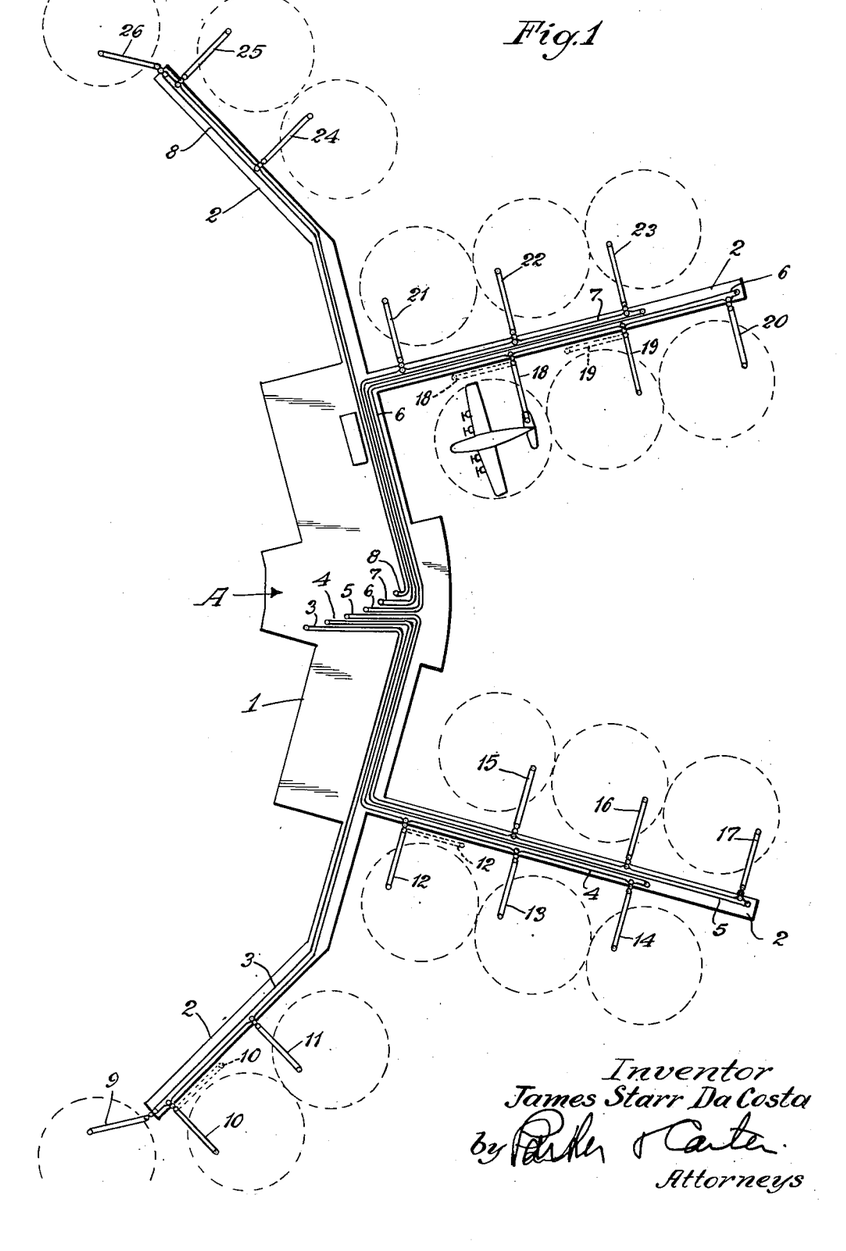
Figure 1 is a plan view or diagram of one form of the invention.

As shown in Figure 1, the conveying system is particularly adapted for use in the handling of baggage and cargo to and from aircraft. The invention is, of course, in no sense limited to that purpose or use, but it may conveniently be illustrated in connection with an air terminal, and it is thus shown in Figure 1.

As shown in Figure 1, the air terminal may comprise walks or pavements or the like indicated generally by the numeral 1 and branch communicating walks indicated by the numeral 2. Whatever general layout of the conveyor may be embodied in a given installation, there will be one or more trunk conveyors which will operate generally from a loading point to secondary or outboard conveyors arranged to deliver baggage or cargo to a specific point, such, for example, as one at which an airplane or other vehicle will be positioned for loading or unloading. The expression "trunk conveyor" is used to describe the conveyor which moves cargo from a main loading or unloading point for the total installation to a secondary conveyor which carries material directly to a vehicle. These secondary conveyors, for convenience, are referred to as "outboard conveyors." In Figure 1 six trunk conveyors are illustrated and are designated generally by the numerals 3, 4, 5, 6, 7, and 8. Trunk conveyor 3 extends from a point at or adjacent the central loading and unloading platform or station A to a plurality of outboard conveyors 9, 10 and 11. The outboard conveyors are mounted upon fixed bases which will be described hereinafter and may be moved throughout an arc. They are shown in Figure 1 in dotted lines in the inactive position and in full line in the active position.

The trunkline 4 extends from the loading point A to the loading area next adjacent that fed by the trunkline 3 and has associated with it three outboard conveyors 12, 13 and 14. The trunkline 5 extends from the loading platform A along the opposite side of the trunk 4 and has associated with it outboard conveyors 15, 16 and 17. The trunkline 6 extends from the loading platform A to and along another loading zone and has associated with it outboard conveyors 18, 19 and 20. Trunkline 7 extends from the loading platform A adjacent the trunk conveyor 6 and has associated with it the outboard conveyors 21, 22 and 23. The trunkline conveyor 8 extends from the loading platform or station A and has associated with it outboard conveyors 24, 25 and 26.

The arrangement shown in Figure 1 indicates that a plurality of trunk conveyors may be so arranged and directed as to extend from a central loading and unloading point to a plurality of vehicle loading and unloading stations or areas. These areas for locating or spotting vehicles are indicated by dotted circles. Associated with each trunkline conveyor is one or more outboard conveyors. The number of these conveyors depends upon the area required for vehicle location and upon the number of vehicles to be handled. The arrangement illustrated by way of example in Figure 1 provides for the simultaneous loading, unloading or handling of eighteen vehicles. The invention is not limited, of course, to any such number and may be embodied in a station or system handling more or less. Each trunkline, as shown in Figure 1, is associated with three outboard conveyors. This number could be varied and more or less may be handled by a single trunk conveyor.

Figure 2:
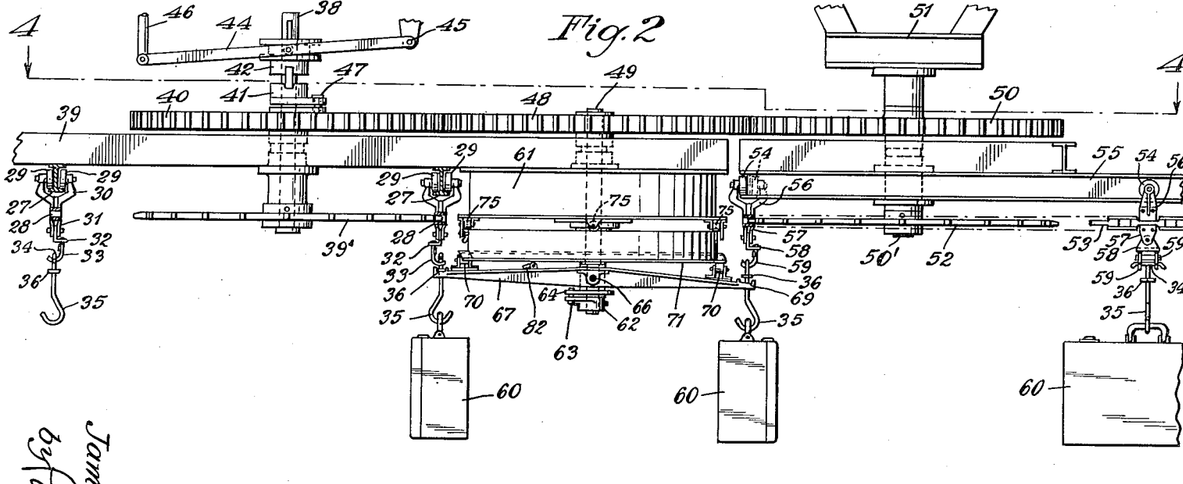
Figure 2 is a side elevation with parts in section showing a transfer point and the conveyors adjacent the transfer point.
Figure 4:
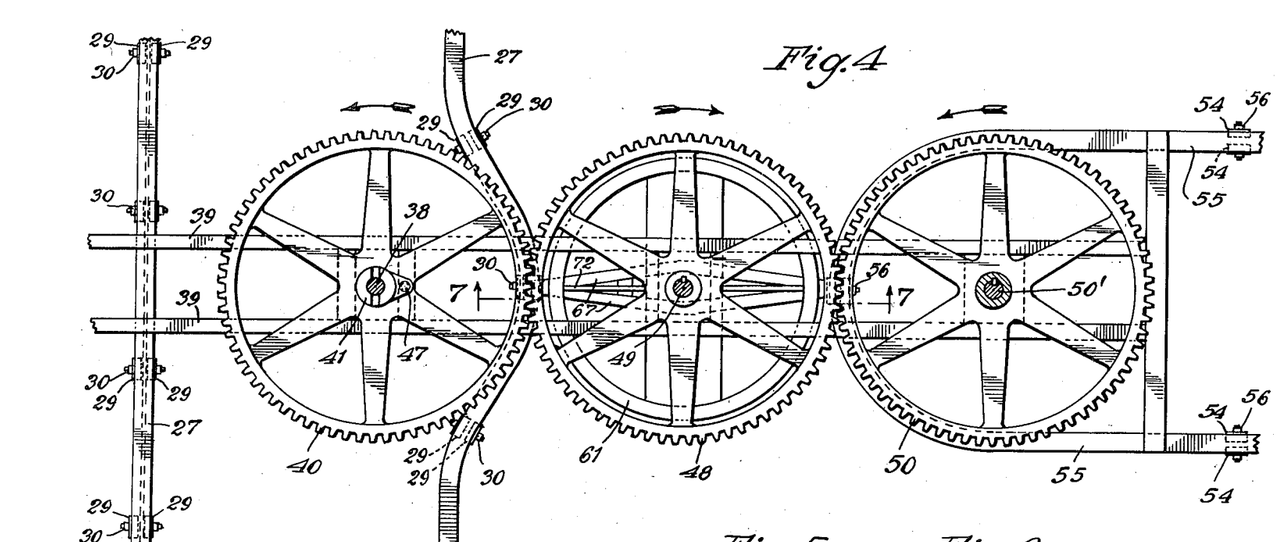
Figure 4 is a plan view illustrating generally the structure of Figure 2, with parts in section taken at line 4—4 of that figure.
Figure 5:
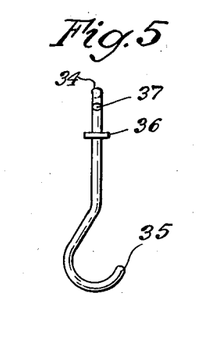
Figure 5 is an elevation of one form of a carrying hook.
Figure 6:
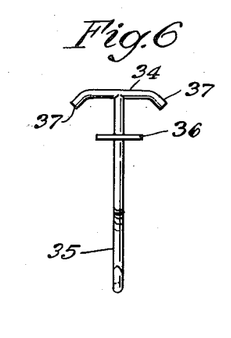
Figure 6 is an elevation showing the hook at an angle of 90°.
Figures 7, 8:
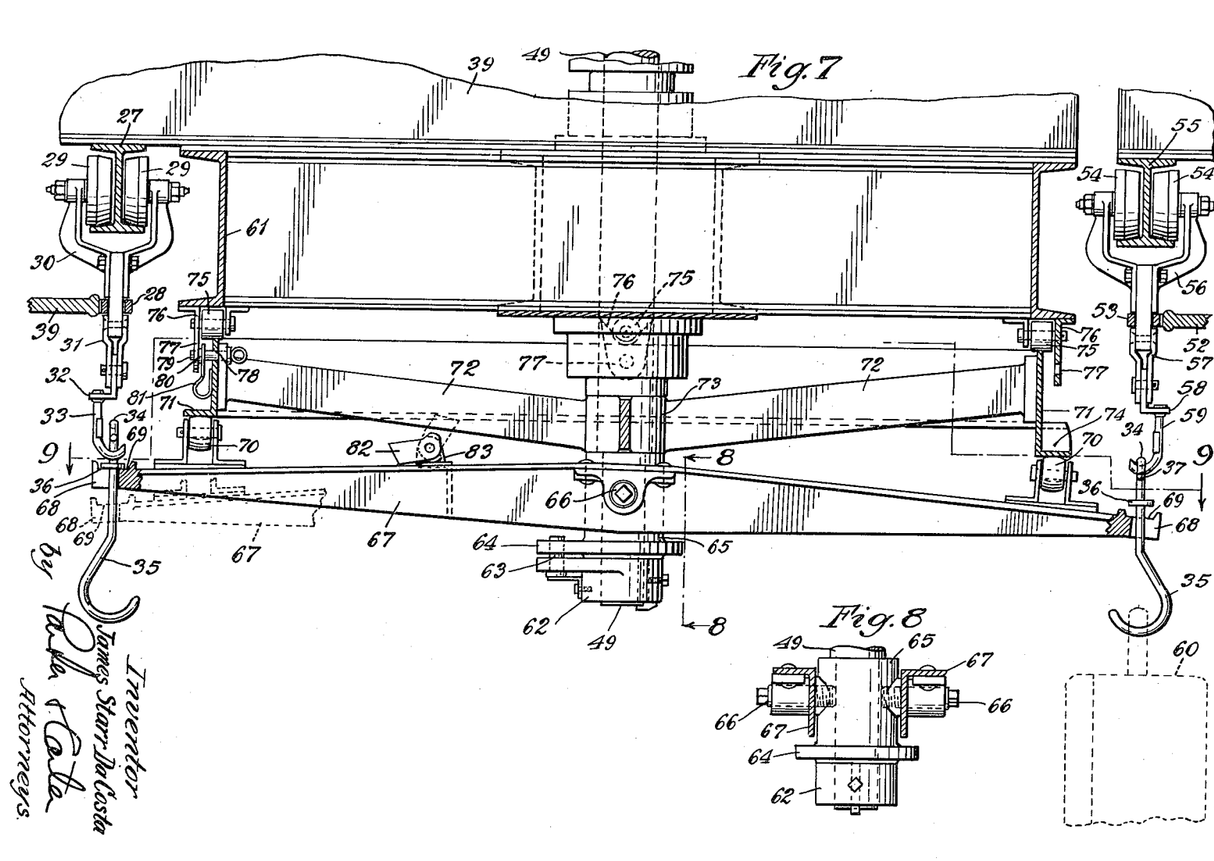
Figure 7 is an enlarged sectional view taken at line 7—7 of Figure 4.
Figure 8 is a section detail taken at line 8—8 of Figure 7.
Figure 10:
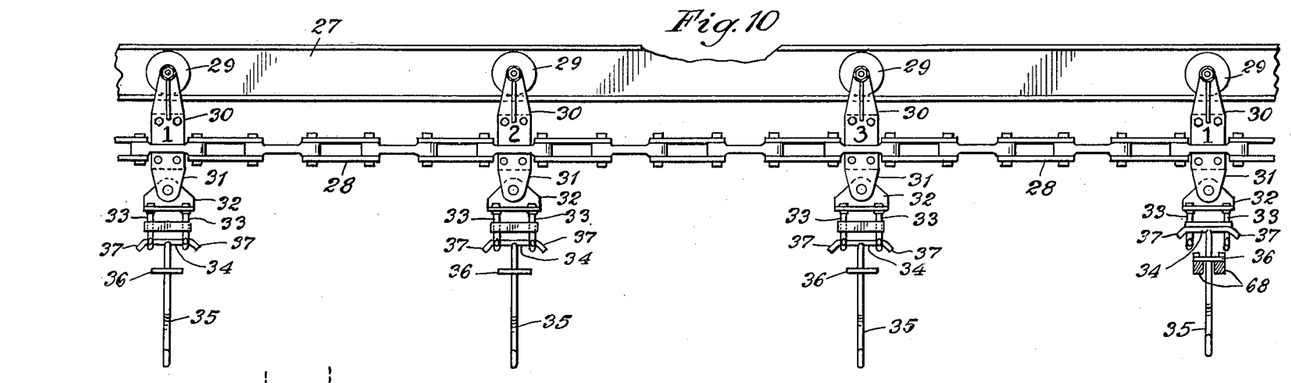
Figure 10 is a side elevation of a trunk carrier section.

In general, the conveyors comprise endless chains or belts, preferably chains. Each trunk conveyor extends about a plurality of guiding and driving sprockets or pulleys, their number and arrangement being dependent upon the particular plan and layout adopted. The chains are illustrated in the present embodiment, and they will normally be preferable. The chains are supported from above upon tracks 27. As shown in detail in Figure 10, chains 28 are carried from the tracks 27 by pulleys 29. Hangers 30 support the chains and provide bearings for the pulleys, and hanger extensions 31 below the hangers 30 and below the chains carry hook support 32 in which hooks 33 are positioned. These hooks 33 receive and support the cross arms 34 of baggage-carrying hooks 35. Each hook is preferably also provided with a laterally extending member 36 which is used when the hook is to be raised and will be described below. The hooks are shaped as shown particularly in Figure 5 to support baggage or cargo. The members 34 are preferably provided with downwardly bent ends 37, 37 to assure satisfactory centering and positioning of the hook structure with relation to the supporting hooks 33, 33. Each hanger 30 is preferably identified with some definite marking. As shown in Figure 10, the hangers are numbered, respectively, 1, 2, and 3. This numbering indicates which of the outboard conveyors fed by that particular trunk conveyor will receive the given hanger and the hook and cargo which it carries. The transfer mechanism which accomplishes this movement and directs a particular hanger to a particular outboard conveyor will be described below. As shown in Figure 10, the hangers are numbered to correspond to the number of outboard conveyor which each hanger will service; these being three in number. The chain is preferably driven by a motor or otherwise from any desired point and operates continuously so long as the drive is in operation. The outboard conveyors are driven each by the trunk conveyor with which it is associated, and the hooks are removed from the trunk conveyor by the transfer mechanism and returned to the trunk conveyor by that mechanism. A transfer station and transfer mechanism are shown in Figures 2, 4 and 7, in particular. At the transfer station shown in these figures, one part of the track 27 may be laterally bent, as shown in Figure 4.

The transfer mechanism may be put into operation and will operate automatically. It may also be put out of operation. As shown, a shaft 38 is supported in suitable bearings, not shown in detail, in a framework 39 which supports the transfer mechanism and may also support the tracks 27. Fixed in this shaft is a sprocket 39' which meshes with the chain 28. Positioned on the shaft also is a gear 40 which, by means of a clutch formed of the parts 41 and 42, may be fastened to the shaft to rotate with it or may be freed from it for relative rotary movement. The clutch is operated by a lever arm 44 pivoted at 45 and moved by a rod 46. The rod 46 may be controlled from any desired point, and when it is moved to close the clutch, the gear 40 will be driven with the shaft 38, and when it is opened, the gear will float on the shaft and will not be driven. 47 is a breaker pin or connection provided in the drive of the gear 40 for safety reasons.

The gear 40 meshes with a gear 48 mounted upon a shaft 49 carried in suitable bearings in any desired part of the framework 39. The gear 48 meshes with a gear 50 mounted on a shaft 50' journaled in a support or framework 51. Fixed to the shaft 50' upon which the gear 50 is mounted is a sprocket 52 with which one of the outboard conveyor chains 53 meshes. The conveyor chains of the outboard conveyors are all preferably of the same construction as that of the chains of the trunk conveyors, and they include rollers 54 engaged upon tracks 55 and carried by hangers 56. Hangers 57 carry hook supports 58 which carry a pair of hooks 59, 59. The chain, roller, hanger, and hook support details of the outboard conveyor chains are preferably the same as those of the trunk conveyor chains and are intended to receive and carry the hooks 35 in the same manner as that in which the trunk conveyor carries the hooks. For purposes of illustration, pieces of baggage 60 are shown in Figure 2 only as engaged upon the hooks 35.

Figure 3:
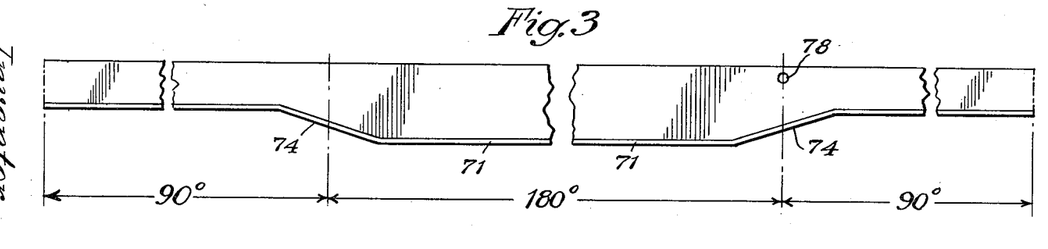
Figure 3 is an enlarged layout diagram illustrating a transfer cam.
Figure 9:
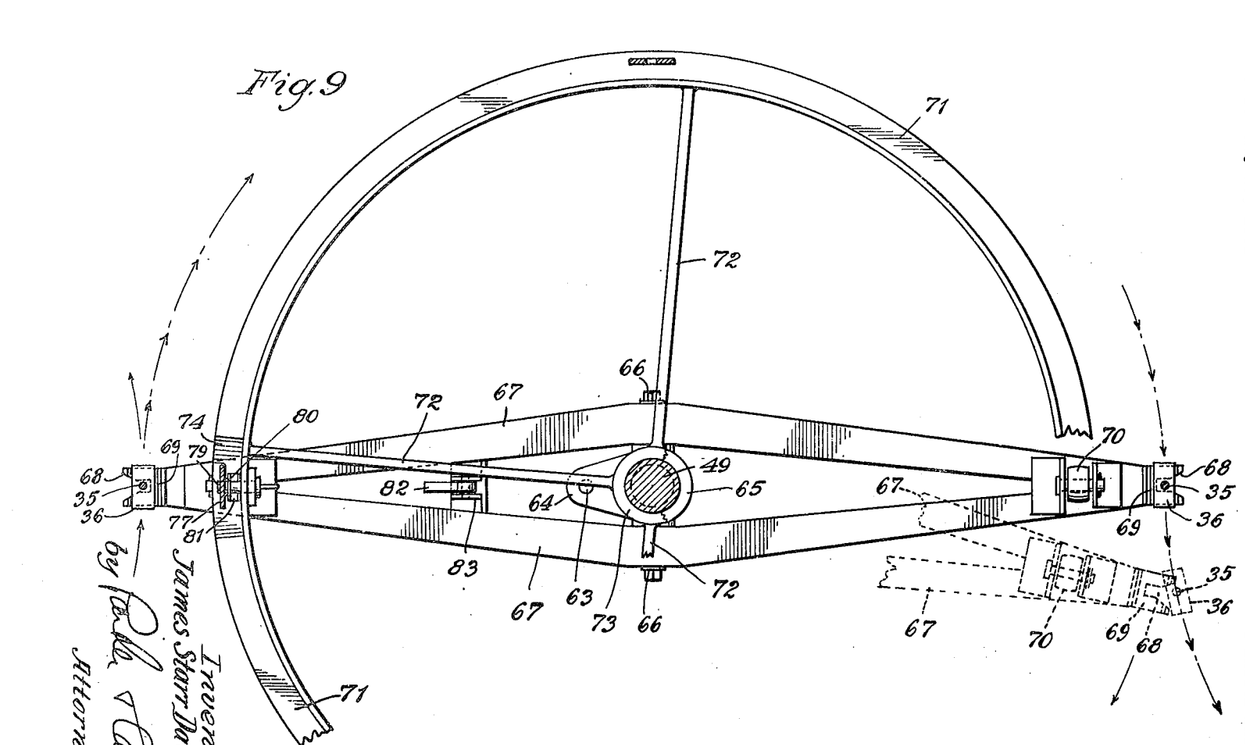
Figure 9 is a plan view with parts in section taken at line 9—9 of Figure 7.

The transfer means, whereby hooks and the load which they may be carrying are transferred from a trunk carrier to a suitable outboard carrier, will now be described. 61 is a circular frame supported on the frame members 39 and includes any desired reinforcement and also supports the bearing for the shaft 49. This bearing is not described in detail. Fixed adjacent the lower end of the shaft 49 is a collar 62 connected by a breaker pin 63 to a collar 64 on a sleeve 65. 66, 66 are a pair of bearing pins fixed in the sleeve 65 upon which the lifting or transfer arm is pivoted. This arm is formed of a pair of members 67 which converge at their free ends and are provided with a fork structure 68 and are shaped on their upper surfaces to provide a depression 69 within which a cross member 36 of a hook 35 may be received. Adjacent each end of the lifting and transfer lever is a roller 70 carried in a suitable bearing and bearing support structure. The rollers 70 are in contact with the working face of a cam 71. This cam, which is rotatably mounted on the shaft 49 by means of spokes 72 and a hub 73, which together comprise a spider, is of circular plan, as shown in Figure 9, and its profile is illustrated in Figure 3, which comprises a development of the cam. Figure 3 illustrates the fact that the upper surface of the cam is formed in a single plane, and that the lower or working surface 71 is provided with upper and lower parts separated by inclined sections 74; the inclined sections being spaced 180° apart. At its upper or plane edge, the cam is in contact with rollers 75 carried in suitable bearings 76 fixed to the frame member 61. There are four rollers 75 spaced equally about the member 61, and, hence, four pairs of bearing supports 76. Each bearing support includes a downwardly extending apertured arm 77. The cam is adjustable about the axis of the shaft 49 and is provided with an opening or perforation 78 through which a pin 79 may be inserted to fix the cam in adjusted position in any one of the members 77. The pin is provided with a flange 80 against which a spring 81 bears. The spring is biased to move the flange into and to hold it in engaging position in any one of the perforated extensions 77. A latch 82 is pivotally carried in a support 83 mounted upon the transfer arm. When the latch is in the full line position of Figure 7 it is inactive. When it is raised to the dotted line position of that figure, it will contact one of the spokes 72 upon which the cam 71 is mounted and will carry it about as the transfer arm 67 is rotated, either from the gear 40 by means of the gear 48 or otherwise, and it will, thus, maintain the cam in proper step relationship with the transfer arm when the cam is to be adjusted from one position to another. The cam may be adjusted from a position in which it will cause the transfer arm to transfer hooks from the trunk conveyor to the adjacent outboard conveyor, or the cam may be adjusted to that position in which it will cause the transfer arm to move hooks from an outboard conveyor to the adjacent trunk conveyor. A third position of adjustment of the cam is that in which it is engaged in an intermediate position. This is used when the given outboard conveyor is to be inactive, and, in that case, the clutch 41, 42 is de-clutched and the outboard conveyor is not in operation, and the transfer arm is moved to an intermediate position in which it will not interfere with hooks or conveyor parts moving past it on a trunk conveyor.

Figure 11:
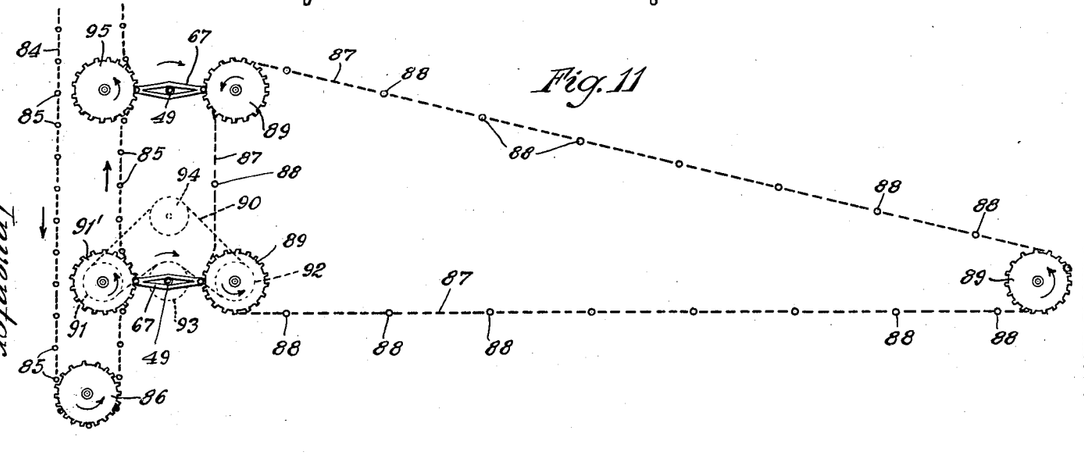
Figure 11 is an enlarged diagrammatic plan view of a modified form of transfer point illustrating the sprockets, chains and transfer members present at that point.

A modified form of transfer means is diagrammatically illustrated in Figure 11 in which a trunkline conveyor 84 is indicated by dash lines, and hook carriers 85 are included in the chain. These are the equivalent of the carriers 30, 31, as shown in Figure 10. The chain 84 engages any suitable number of sprockets and guiding means. 86 is one sprocket indicated at the end of the run.

87 is the conveyor chain of an outboard conveyor, and it includes a plurality of carrying members 88 which are comparable to the parts 56 and 57, as shown in Figure 2 and elsewhere. These are not illustrated again because the details of the hooks and hook-engaging parts may be identical with those shown in Figure 2. The conveyor chain 87 is engaged with a plurality of sprockets 89 which are carried in suitable supports not shown. The drive may be the same as that shown in Figures 2 and 4 above and is not repeated in Figure 11. If desired, instead of the gear drive of Figures 2 and 4, a chain drive may be used, and this is suggested in dotted lines in Figure 11 in which a chain 90 engages a sprocket 91 which is driven by the chain 84. A sprocket 91' is fixed on the shaft which carries the sprocket 91 and is the equivalent of the sprocket 39 of Figure 7. A sprocket 92 is mounted on the shaft upon which the sprocket 89 is mounted and is driven by the chain 90. An idler sprocket 93 is positioned upon the shaft which carries the transfer arm 67 and a take-up sprocket 94 is included, if desired. A second transfer arm 67 is shown arranged to operate between a driven sprocket 95 and the sprocket 89. The sprocket 95 is driven by the chain 84 in the same manner as that in which the sprocket 91 is driven.

The transfer arm 67, as shown in Figure 11, is the same in construction as the transfer arms shown in the earlier figures in detail, and the cam means and adjusting means for controlling and operating them are the same. Since, however, two transfer arms are shown in connection with a single outboard conveyor chain assembly, a modification in operation is possible. One transfer arm; for example, the lowermost on Figure 11, is adjusted in the full line position of Figure 7 to transfer hooks from the trunk conveyor to the outboard conveyor, and the other or upper transfer arm, as shown in Figure 11, is adjusted to transfer hooks from the outboard conveyor chain to the trunk conveyor chain. This adjustment is accomplished by rotating the cam 180° from the position of Figure 7. Thus, in the construction in Figure 11, hooks move progressively from the trunk conveyor to the outboard conveyor, about that conveyor, and are returned progressively to the trunk conveyor. The chains and transfer members of the form shown in Figure 11 are so proportioned and spaced that the hooks which are taken from the trunk conveyor are returned to it in proper position and proper order.

Although I have shown an operative form of my invention, it will be recognized that many changes in the form, shape and arrangement of parts may be made without departing from the spirit of the invention, and my showing is, therefore, to be taken as, in a sense, diagrammatic.

The use and operation of this invention are as follows:

In general, the precise layout of a given embodiment of the present invention will depend upon the particular problem existing and the particular solution required. For many purposes, a main receiving and dispatching point will be provided, and each of the trunk conveyors will communicate with that point. In the particular installation shown herewith, the device is applied to the handling of baggage at an aircraft terminal or airport. A central point exists, and each of the trunk conveyors includes a portion close to the central point. This might, for example, be a baggage room or baggage platform, or some comparable facility. The trunk conveyors extend one, at least, to each loading and unloading area adjacent an aircraft parking space. It is convenient to provide the device as shown, in which a given pair of trunk conveyors extends more or less side by side between two parking areas. Thus, the two trunk conveyors may be supported upon a single supporting structure if desired, and they may be associated with a single covering or roof arrangement by means of which the trunk conveyors are protected from the elements, if that is desired. Obviously, a supporting structure may or may not include a roof. Whatever the precise arrangement, a trunk conveyor is laid out to carry material from a main receiving and dispatching point to an outboard conveyor. There may be a single outboard conveyor in communication with a single trunk conveyor, or there may be a plurality of outboard conveyors. The determination of the location and number of outboard conveyors depends, of course, upon the particular problem faced.

Each outboard conveyor is so related to its trunk conveyor that material is transferred from the trunk conveyor or trunkline to the outboard conveyor and is returned from the outboard conveyor to the trunkline conveyor. In the form of the invention illustrated in the first ten figures, there is but a single transferring member at a given transfer point, and, thus, carriers and baggage, or other load, is transferred only in one direction at a time; that is to say, if it is desired to convey material from the central loading point to a given aircraft, the transfer device at the transfer point is so adjusted that it will pick off predetermined hooks from the trunkline and transfer them to the selected outboard conveyor. When they reach a terminal point on the outboard conveyor, they must all be removed.

The proportion of the parts is such that as the transfer element rotates it will take only the predetermined hooks from the trunk conveyor and transfer them to the outboard conveyor. It will be noticed that in Figure 10 the hooks or the hangers which carry the hooks are numbered 1, 2 and 3. The hooks are so numbered, or otherwise designated, on each trunkline conveyor. Since three outboard conveyors are shown in connection with each trunkline conveyor, the hooks are numbered only 1, 2 and 3, and the proportions and dimensions of the parts are such that the transfer member will pick up every third hook and transfer it from the trunkline to the outboard conveyor. The parts are, of course, properly adjusted to accomplish this result, and all of the No. 1 hooks as they pass the first transfer point will be picked up by the transfer member and deposited on the first outboard conveyor. The second and third hooks will continue through the trunk conveyor and the No. 2 hooks will be removed by the second outboard conveyor. Correspondingly, the No. 3 hooks will be removed by the third outboard conveyor, and after the trunk conveyor has passed the third transfer point; that is to say, the transfer point for the third conveyor, all of the hooks will have been removed and transferred to an outboard conveyor. The hooks, as they reach the loading point at each parking position adjacent each outboard conveyor, will be removed.

When it is desired to unload baggage; for example, from an aircraft, each transfer member will be adjusted to opposite position by the mechanism above described, and with the parts operating in that position and all of the conveyors running, hooks—with or without baggage—are placed upon the outboard conveyors, and each outboard conveyor moves the hooks upon it to its transfer point, at which point the transfer member removes the hooks from the outboard conveyor and carries them about and engages them with the trunk conveyor. They are then returned along the trunk conveyor to the main loading point or baggage room at the terminal. At that point the loads or hooks are removed. The outboard conveyors—one or more of them—may be de-clutched and put out of operation by the clutching mechanism shown. Thus, where a given trunk conveyor is set up to handle hooks and baggage to and from a plurality of outboard conveyor, one outboard conveyor may be made inactive and the others may remain active or only a single outboard conveyor may remain active. Each outboard conveyor is, as above explained, driven from the trunk conveyor, and when a particular outboard conveyor is de-clutched, it will stop, and the transfer means at the transfer point for that outboard conveyor is moved into the inactive position and the trunk conveyor may continue to move without affecting any de-clutched and, therefore, inoperative outboard conveyor.

The form of the invention thus described as shown in the first ten figures will carry hooks with or without load to and from an outboard conveyor, but the adjustment of the parts is such that hooks, with or without loads, will be taken from the trunk conveyor and deposited on the outboard conveyor or else they will be taken from the outboard conveyor and deposited on the trunk conveyor. Thus, a given outboard conveyor is, in the first form of the invention, when in operation, either loading or unloading. It is either receiving or discharging hooks. In the second form of the invention, the modification of the transfer point structure is such that each outboard conveyor may simultaneously receive and give up hooks or other load carriers.

In the modified form of the invention, as shown in Figure 11, each outboard conveyor is provided with two transfer members. The proportioning of the parts is the same as that above described, and the hooks and hook carriers are so arranged that each transfer member will take only those hooks which occupy the position predetermined for that particular outboard conveyor. As in the form of the invention above described, if there be three outboard conveyors, the hooks and hook carriers are so arranged, and the transfer member is so proportioned, that the first transfer member will take off every third hook and transfer it to its outboard conveyor, and the transfer member at the second transfer station will take off every second hook and transfer it to its outboard conveyor. Thus, the selective result is accomplished in the form of Figure 11 just as in the form of the earlier figures. The difference between the two forms of the device resides primarily in the fact that for each outboard conveyor two transfer members are provided, and they operate simultaneously, but to accomplish opposite results. The first transfer member for a given outboard conveyor takes the predetermined hooks from the trunkline and transfers them to the outboard conveyor, and they are carried about that conveyor. As they move about the conveyor, the hooks may be removed or not, and if they carry loads, the loads will be removed and the hooks may remain in position on the conveyor. They will be carried about the outboard conveyor until they reach the second transfer member for that conveyor. When they reach the second transfer member, they are returned by it from the outboard conveyor to the trunk conveyor. Thus, by the use of two transfer members for each outboard conveyor, it is possible to operate the conveyor system so that hooks in predetermined order move from the trunk conveyor to the predetermined outboard conveyor, move continuously about that conveyor and are continuously returned in the same order to the trunk conveyor. It is not necessary in this form of the device to alter the adjustment of the parts or of the transfer members because by utilizing simultaneously two transfer members for each outboard conveyor the entire operation of moving hooks to and from each outboard conveyor may continue simultaneously, and it is only necessary to remove loads from the hooks or to deposit loads on the hooks to accomplish the purpose of moving loads to the desired point on an outboard conveyor and returning loads from an outboard conveyor to the baggage room or other main transfer point.

In considering the flexibility of operation of the device herein described and claimed, and taking Figures 1 and 11 as illustrative, it may be understood that planes are continuously arriving and leaving at an airport and are picking up or dropping baggage, or, at a given stop, may both drop and pick up baggage. I illustrate, in Figure 1, six basic conveyor lines or trunk conveyors, each of which is shown as having associated with it a plurality of outboard conveyors. In Figure 11 I illustrate a transfer arrangement which permits carriers to be sent from an outboard conveyor back to the point of origin, at the same time that the outboard conveyor is receiving carriers from the trunk conveyor. Each trunk conveyor or line can thereby be used, for example, for the following operations: It can take the incoming baggage from three planes. It can take incoming baggage from two planes, while sending outgoing baggage to one plane. It can send outgoing baggage to two planes and receive incoming baggage from one plane. Or it can send outgoing baggage to three planes. The flexibility of this system very substantially speeds up the handling of baggage, and the structure insures a positive and constant supply of carriers, moving between the trunk conveyors and the outboard conveyors. The direction of travel of the baggage carriers is reversible, in that the outboard conveyor can accept carriers traveling from loading point to plane and, at the same time, return carriers from plane to unloading point.

I claim:

1. In combination, a plurality of conveyors, means for driving one of said conveyors, each conveyor shaped to receive removably a plurality of load carriers, and means for transferring said load carriers from one conveyor to another, said means comprising a transfer member positioned adjacent parts of two conveyors, each end of said transfer member being shaped to engage a load carrier, means for raising one part of said transfer member and for simultaneously lowering another part of said transfer member, the movement of said transfer member being effective to remove a load carrier from one conveyor and the movement of said transfer member being effective to deposit a load carrier on the other conveyor.

2. In combination, a plurality of conveyors, means for driving one of said conveyors and for driving another of said conveyors from said first-mentioned conveyor, each conveyor shaped to receive removably a plurality of load carriers, and means for transferring said load carriers from one conveyor to another, said means comprising a transfer member positioned adjacent parts of two conveyors, each end of said transfer member being shaped to engage a load carrier, means for raising one part of said transfer member and for simultaneously lowering another part of said transfer member, the movement of said transfer member being effective to remove a load carrier from one conveyor and the movement of said transfer member being effective to deposit a load carrier on the other conveyor.

3. In combination, a plurality of conveyors, means for driving one of said conveyors and for driving another of said conveyors from said first-mentioned conveyor, each conveyor shaped to receive removably a plurality of load carriers, and means for transferring said load carriers from one conveyor to another, said means comprising a transfer member positioned between adjacent parts of two conveyors, each end of said transfer member being shaped to engage a load carrier, means for raising one part of said transfer member and for simultaneously lowering another part of said transfer member, the movement of said transfer member being effective to remove a load carrier from one conveyor and the movement of said transfer member being effective to deposit a load carrier on the other conveyor.

4. In combination, a plurality of conveyors, means for driving one of said conveyors and for driving another of said conveyors from said first-mentioned conveyor, each conveyor shaped to receive removably a plurality of load carriers, and means for transferring said load carriers from one conveyor to another, said means comprising a rotary transfer member positioned adjacent parts of two conveyors, each end of said transfer member being shaped to engage a load carrier, means for raising one part of said transfer member and for simultaneously lowering another part of said transfer member, the movement of said transfer member being effective to remove a load carrier from one conveyor and the movement of said transfer member being effective to deposit a load carrier on the other conveyor.

5. In combination, a plurality of conveyors, means for driving one of said conveyors, each conveyor shaped to receive removably a plurality of load carriers, and means for transferring said load carriers from one conveyor to another, said means comprising a rotary transfer member positioned between adjacent parts of two conveyors, each end of said transfer member being shaped to engage a load carrier, means for raising one part of said transfer member and for simultaneously lowering another part of said transfer member, the movement of said transfer member being effective to remove a load carrier from one conveyor and the movement of said transfer member being effective to deposit a load carrier on the other conveyor.

6. In combination, a plurality of conveyors, means for driving one of said conveyors, each conveyor shaped to receive removably a plurality of load carriers, means for transferring said load carriers from one conveyor to another, said means comprising a transfer member positioned adjacent parts of two conveyors, and means for raising and lowering opposite ends of said transfer member, each end of said transfer member being shaped to engage a load carrier, means for raising one part of said transfer member and for simultaneously lowering another part of said transfer member, the raising movement of said transfer member being effective to remove a load carrier from one conveyor and the lowering movement of said transfer member being effective to deposit a load carrier on the other conveyor.

7. In combination, a plurality of conveyors, means for driving one of said conveyors, each conveyor shaped to receive removably a plurality of load carriers, means for transferring said load carriers from one conveyor to another, said means comprising a rotary transfer member positioned adjacent parts of two conveyors, and means for raising and lowering opposite ends of said transfer member simultaneously and to move them in opposite directions simultaneously, each end of said transfer member being shaped to engage a load carrier, the raising movement of said transfer member being effective to remove a load carrier from one conveyor and the lowering movement of said transfer member being effective to deposit a load carrier on the other conveyor.

8. In combination, a plurality of conveyors, means for driving one of said conveyors and for driving another of said conveyors from said first-mentioned conveyor, each conveyor shaped to receive removably a plurality of load carriers, means for transferring said load carriers from one conveyor to another, said means comprising a rotary transfer member positioned between adjacent parts of two conveyors, and means for raising and lowering opposite ends of said transfer member simultaneously and to move them in opposite directions simultaneously, each end of said transfer member being shaped to engage a load carrier, the raising movement of said transfer member being effective to remove a load carrier from one conveyor and the lowering movement of said transfer member being effective to deposit a load carrier on the other conveyor.

9. In combination in a conveyor system, a main trunk conveyor, comprising a chain and means for driving said chain, a plurality of load carriers removably mounted on said trunk conveyor, a plurality of outboard conveyors associated with said trunk conveyor, transfer means associated adjacent a trunk conveyor and each of its outboard conveyors, said transfer means comprising a pair of transfer members and means for moving them, said transfer members being provided with load carrier engaging parts, and means for simultaneously causing one of said transfer members to transfer a load carrier from said trunk conveyor to an outboard conveyor and the other of said transfer members to transfer a load carrier from said last named outboard conveyor to said trunk conveyor.

10. In combination in a conveyor system, a main trunk conveyor, comprising a chain and means for driving said chain, a plurality of load carriers mounted on said trunk conveyors, a plurality of outboard conveyors associated with said trunk conveyor, transfer means positioned adjacent a trunk conveyor and each of its outboard conveyors, said transfer means comprising a transfer member and means for moving it in rotation, said transfer members provided with load carrier engaging parts, and cam means for tilting said transfer means as they rotate and for causing each transfer means to transfer a load carrier from one conveyor to another with each rotation.

11. In a conveyor system, a trunk conveyor extending from a predetermined loading and unloading zone, an outboard conveyor having a portion adjacent a portion of said trunk conveyor, and a plurality of transfer means positioned at the thus formed zone of approach between the outboard conveyor and the trunk conveyor, means for driving said conveyor and said transfer means, each said conveyor including portions formed and adapted removably to receive a load carrier moving with the conveyor, each transfer means including elements adapted to receive load carriers from the trunk conveyor and to transfer the said carriers to the outboard conveyor and to receive load carriers from the outboard conveyor and to return them to the trunk conveyor, said transfer means being spaced apart.

12. The structure of claim 11 characterized in that the elements of the transfer means which receive load carriers from the trunk conveyor and of the transfer means which receive load carriers from the outboard conveyor operate simultaneously, whereby carriers are generally simultaneously delivered from the trunk conveyor to the outboard conveyor and from the outboard conveyor to the trunk conveyor.

13. A conveyor system comprising a plurality of trunk conveyors extending from and having terminal portions grouped within a predetermined loading and unloading zone, a plurality of outboard conveyors each having a portion adjacent a portion of one trunk conveyors, and a plurality of transfer positioned at the thus formed zones of approach between each outboard conveyor and its trunk conveyor, and means for operating them simultaneously to convey load carriers simultaneously between a trunk conveyor and a single outboard conveyor, each said trunk and outboard conveyor including portions formed and adapted removably to receive a plurality of interchangeable load carriers, said transfer means including elements adapted to receive load carriers from a trunk conveyor and to transfer them to an outboard conveyor and to receive load carriers from an outboard conveyor and to return them to a trunk conveyor.

14. In a conveyor system, a trunk conveyor extending from a predetermined loading and unloading zone, an outboard conveyor having a portion extending adjacently and in parallel with a portion of said trunk conveyor, and a plurality of transfer means mounted for movement and spaced apart along the thus formed zone of approach between the outboard conveyor and the trunk conveyor, each said conveyor including portions formed and adapted removably to receive a plurality of load carriers moving in sequence with the conveyor, one said transfer means positioned to receive load carriers from the trunk conveyor for transfer to the outboard conveyor, and the other transfer means positioned to receive load carriers from the outboard conveyor for return to the trunk conveyor.

References Cited in the file of this patent

UNITED STATES PATENTS

| | | |
|---|---|---|
| 1,654,091 | Peiler | Dec. 27, 1927 |
| 2,120,052 | Bishop | June 7, 1938 |
| 2,307,517 | Langer et al. | Jan. 5, 1943 |
| 2,335,790 | Ransburg | Nov. 30, 1943 |